United States Patent
Ringk et al.

(10) Patent No.: US 10,374,210 B2
(45) Date of Patent: Aug. 6, 2019

(54) TERMINAL ASSEMBLY FOR AN ELECTRONIC CELL

(71) Applicant: Robert Bosch GmbH, Stuttgart (DE)

(72) Inventors: Andreas Ringk, Bamberg (DE); Florian Postler, Schesslitz (DE); Martin Busche, Stuttgart (DE); Anton Ringel, Bamberg (DE); Jeffrey Buckholz, Rochester Hills, MI (US)

(73) Assignees: Robert Bosch Battery Systems LLC, Orion, MI (US); Robert Bosch GmbH, Stuttgart (DE)

(*) Notice: Subject to any disclaimer, the term of this patent is extended or adjusted under 35 U.S.C. 154(b) by 63 days.

(21) Appl. No.: 15/795,733

(22) Filed: Oct. 27, 2017

(65) Prior Publication Data
US 2019/0131610 A1   May 2, 2019

(51) Int. Cl.
  *H01M 2/30* (2006.01)
  *H01M 2/06* (2006.01)

(52) U.S. Cl.
  CPC .............. *H01M 2/30* (2013.01); *H01M 2/06* (2013.01)

(58) Field of Classification Search
  CPC .................................. H01M 2/30; H01M 2/06
  See application file for complete search history.

(56) References Cited

U.S. PATENT DOCUMENTS

2013/0087364 A1   4/2013   Blome et al.
2017/0098815 A1*  4/2017   Kim ...................... H01M 2/348

FOREIGN PATENT DOCUMENTS

KR   20140114696   9/2014

\* cited by examiner

*Primary Examiner* — Cynthia K Walls
(74) *Attorney, Agent, or Firm* — Kelly McGlashen; Maginot Moore & Beck LLP (57) ABSTRACT

An electrochemical cell includes a prismatic cell housing including a lid plate that closes one end of the housing. The cell also includes a terminal assembly having a simple structure that is supported on the lid plate. The terminal assembly includes the lid plate, a terminal and an adhesive layer that is disposed between and secures the terminal to the lid plate. The terminal assembly includes features that allow the adhesive layer to flow in a controlled and reproducible manner over the entirety of a predetermined area without flowing beyond the predetermined area. The features result from forming a stop line in the predetermined area by applying a surface treatment to the predetermined area. The stop line delineates a desired adhesive later outer boundary and engages the adhesive so as to maintain the adhesive within the predetermined area.

20 Claims, 5 Drawing Sheets

TERMINAL ASSEMBLY FOR AN ELECTRONIC CELL

BACKGROUND

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs can be formed of a plurality of battery modules, where each battery module includes several electrochemical cells. Within the battery modules, the cells are arranged in two or three dimensional arrays and are electrically connected in series and/or in parallel. Likewise, the battery modules within a battery pack are electrically connected in series and/or in parallel.

Different cell types have emerged in order to deal with the space requirements of a very wide variety of installation situations, and the most common types, used in automobiles are cylindrical cells, prismatic cells, and pouch cells. Regardless of cell type, each cell may include a cell housing and an electrode assembly disposed in the cell housing. The electrode assembly includes an alternating series of stacked or rolled positive electrode plates and negative electrode plates that are separated by an intermediate separator material. A liquid electrolyte sealed within the cell housing infiltrates the electrode assembly. Each cell may also include a positive terminal that is electrically connected to the positive electrode plates and protrudes outside the cell housing via a first sealed hole in the cell housing, and a negative terminal that is electrically connected to the negative electrode plates and protrudes outside the cell housing via a second sealed hole in the cell housing.

There are technical challenges associated with providing a reliable seal around the terminals as the terminals exit the cell housing. When the cell housing is electrically conductive and the terminals are required to be electrically isolated from the cell housing, further challenges are presented. Although some electrochemical cells include terminal assemblies that address these challenges, the solutions tend to be complex in that they include many parts and thus are complex and costly to manufacture and assemble. A need exists for a terminal assembly that addresses the challenges described above, and that is simple, easily manufactured, and can be produced at a low cost.

SUMMARY

In some aspects, a terminal assembly for an electrochemical cell includes a lid plate that closes one end of a cell housing of the electrochemical cell. The lid plate includes an opening. The terminal assembly also includes a terminal including a terminal plate and a boss that protrudes from an outward facing surface of the terminal plate, and an adhesive layer disposed between the lid plate and the terminal. The terminal is assembled with the lid plate such that the outward facing surface faces an inner surface of the lid plate and the boss extends through the opening. One of the outward facing surface of the terminal plate and the inner surface of the lid plate comprises a first region and a second region. The first region is spaced apart from the boss. The second region is disposed between the first region and the boss. The first region has first surface properties, the second region has second surface properties that are different than the first surface properties, and an outer boundary of the adhesive layer resides in an area corresponding to the first region when the terminal assembly is viewed in top plan view.

In some embodiments, the first surface properties are configured to negatively impact a flow of the adhesive layer, whereby the presence of the first region having the first surface properties serves as a stop line that inhibits the flow of the adhesive layer. In addition, the second surface properties are configured to have less negative impact on the flow of the adhesive layer than that of the first surface properties.

In some embodiments, the first surface properties are a result of a surface treatment, and the second surface properties are a result of a lack of the surface treatment.

In some embodiments, the first region encircles the boss.

In some embodiments, the adhesive layer overlies both the first region and the second region.

In some embodiments, an outer periphery of the adhesive layer overlies an outer boundary of the first region when the terminal is viewed in top plan view.

In some embodiments, the outward facing surface of the terminal plate includes the first region and the second region, and the first region includes a portion of the outward facing surface of the terminal plate that adjoins a peripheral edge of the terminal plate.

In some embodiments, an outer boundary of the first region coincides with the portion of the outward facing surface of the terminal plate that adjoins a peripheral edge of the terminal plate.

In some embodiments, the second region adjoins the boss and the second surface properties are a result of a lack of a surface treatment.

In some embodiments, the adhesive layer overlies the first region and the second region so as to extend between the boss and an outer boundary of the first region.

In some embodiments, the first surface properties are a result of a surface treatment that is configured to form a roughened surface.

In some embodiments, the first surface properties are a result of a surface treatment that is configured to form an oxidation layer.

In some embodiments, the cell housing is formed of metal, the terminal is formed of metal, and the adhesive layer secures the terminal to the lid plate, provides a fluid-tight seal between the cell housing and the terminal, and electrically isolates the cell housing from the terminal.

In some aspects, a method of forming a terminal assembly for an electrochemical cell is provided. The method includes the following method steps: Providing a lid plate that is configured to close an open end of a housing of the electrochemical cell, the lid plate including an opening; providing a terminal comprising a terminal plate and a boss that protrudes from an outward facing surface of the terminal plate; treating with a surface treatment a first region of one of an inner surface of the lid plate and the outward facing surface of the terminal plate such that the first region has first surface properties, and applying an adhesive layer to the one of an inner surface of the lid plate and the outward facing surface of the terminal plate. The first surface properties are configured to negatively impact a flow of the adhesive layer, whereby the presence of the first region having the first surface properties serves as a stop line that inhibits the flow of the adhesive layer along the one of the inner surface of the lid plate and the outward facing surface of the terminal plate. In addition, an outer boundary of the adhesive layer resides in an area corresponding to the first region when the terminal assembly is viewed in plan view. The method also includes assembling the terminal with the lid plate such that the outward facing surface of the terminal plate confronts the inner surface of the lid plate, the boss extends through the opening, and the adhesive layer provides a fluid-tight seal between the cell housing and the terminal, and electrically isolates the cell housing from the terminal.

In some embodiments, the first region is spaced apart from the boss, and the one of an inner surface of the lid plate and the outward facing surface of the terminal plate includes a second region disposed between the first region and the boss. The second region has second surface properties that are different than the first surface properties, and the adhesive layer is disposed in both the first region and the second region.

In some embodiments, the second surface properties are configured to allow greater flow of the adhesive layer than the first surface properties.

In some aspects, a method of forming a terminal assembly for an electrochemical cell is provided. The method includes the following method steps: Providing a lid plate that is configured to close an open end of a housing of the electrochemical cell, the lid plate including an opening; providing a terminal comprising a terminal plate and a boss that protrudes from an outward facing surface of the terminal plate; prior to application of an adhesive layer to one of an inner surface of the lid plate and the outward facing surface of the terminal plate, forming a stop line of the adhesive layer by providing a surface treatment in a first region of the one of the inner surface of the lid plate and the outward facing surface of the terminal plate, the first region formed at a location corresponding to the stop line; applying an adhesive layer to the one of the inner surface of the lid plate and the outward facing surface of the terminal plate, the adhesive layer forming an adhesive layer peripheral boundary that coincides with the stop line; and assembling the terminal with the lid plate such that the outward facing surface of the terminal plate confronts the inner surface of the lid plate, the boss extends through the opening, and the adhesive layer provides a fluid-tight seal between the cell housing and the terminal and electrically isolates the cell housing from the terminal.

In some embodiments, the first region is spaced apart from the boss, and the one of an inner surface of the lid plate and the outward facing surface of the terminal plate includes a second region disposed between the first region and the boss. The second region has second surface properties that are different than the first surface properties, and the adhesive layer is disposed in both the first region and the second region.

In some embodiments, the second surface properties are configured to allow greater flow of the adhesive layer than the first surface properties.

In some aspects, a terminal assembly for an electrochemical cell is provided. The terminal assembly consisting of only the following three elements: A lid plate configured to close one end of a cell housing of the electrochemical cell, the lid plate including an opening; a terminal including a terminal plate and a boss that protrudes from an outward facing surface of the terminal plate, and an adhesive layer disposed between the lid plate and the terminal. The terminal is assembled with the lid plate such that the outward facing surface faces an inner surface of the lid plate and the boss extends through the opening.

In some aspects, an electrochemical cell includes a prismatic cell housing. The housing includes a sidewall arranged to form a hollow, closed shape when viewed in cross section, and a lid plate that closes an open end of the sidewall. The lid plate includes an opening through which a portion of a terminal extends. The lid plate, the terminal and an adhesive layer that is disposed between the lid plate and the terminal form a terminal assembly. The terminal includes a terminal plate and a boss that protrudes from an outward facing surface of the terminal plate. The terminal is assembled with the lid plate such that the outward facing surface of the terminal confronts an inner surface of the lid plate and the boss extends through the opening. The adhesive layer serves to secure the terminal to the lid plate. In addition, the adhesive layer provides a fluid seal that prevents the electrolyte within the housing from exiting via the terminal openings and also prevents environmental humidity from entering the cell housing. In cases where the cell housing is formed of metal, the adhesive layer also electrically isolates the cell housing from the terminal. To achieve these functions, the adhesive layer is required to cover the area between the terminal boss and a peripheral edge of the terminal plate. However, if the adhesive layer does not extend to the peripheral edge of the terminal plate, in some cases it is possible for an electrical short circuit to occur between the terminal plate and the lid plate, and/or it is possible for an electrolyte leak to occur. On the other hand, if the adhesive layer extends beyond the peripheral edge of the terminal plate, other problems can arise, for example misalignment or contamination of cell internal components due to interference with the excess adhesive, which can lead to cell malfunction.

The terminal assembly includes features that allow the adhesive layer to flow in a controlled and reproducible manner over the entirety of a predetermined area without flowing beyond the predetermined area. To this end, the features include providing a stop line that delineates a desired adhesive later outer boundary and engages the adhesive so as to maintain the adhesive within the predetermined area. The stop line is formed by providing the terminal plate surface and/or the lid plate surface with a first region at a location corresponding to the stop line.

The first region is spaced apart from the boss and/or the lid plate opening, and has received a surface treatment that "activates" the surface. The term "activates" refers to generating structures or chemical groups that are configured to interact with or bond with the adhesive. Since the first region has surface properties that are configured to interact with or bond with the adhesive, the first region serves as a stop line that engages the adhesive and prevents flow beyond the first region. In addition, a second region is disposed between the first region and the boss and/or the lid plate opening. Adhesive is also applied to the second region and the second region has surface properties that are different than the surface properties of the first region. For example, in some embodiments, the second region has not been subjected to the above-described activating surface treatment and for example is free of heat treatment, and thus the adhesive flow is greater within the second region than the first region.

Thus, during assembly of the terminal assembly, adhesive is applied to one of the outward facing surface of the terminal plate and the inner surface of the lid plate. The adhesive flows along the surface but is prevented from flowing beyond an outer boundary of the first region due to the interaction between the adhesive and the activated surface within the first region. By strategic placement of the first region, the predetermined area can be accurately defined, and adhesive application can be performed in a controlled and reproducible manner.

In the illustrated embodiment, for example, the first region is a region of narrow width that extends along a peripheral edge of the terminal plate outward facing surface, where the width of the first region corresponds to a distance between inner and outer peripheral boundaries of the first region. The first region extends along the entire periphery of the terminal plate, and thus surrounds the boss. In addition, the second region is disposed between the first region and the boss, and thus also encircles the boss. Because the second region has not been subjected to the activating surface treatment, the adhesive is permitted to flow therein and can spread in all directions along the surface including into the first region. In the fully assembled configuration of the terminal assembly, the adhesive layer overlies both the first region and the second region, but does not extend outward beyond the first region. In the illustrated embodiment, due to the placement of the first region at the periphery of the outward facing surface of the terminal plate, the adhesive does not flow beyond the periphery of the outward facing surface of the terminal plate.

DETAILED DESCRIPTION

Figure 1:
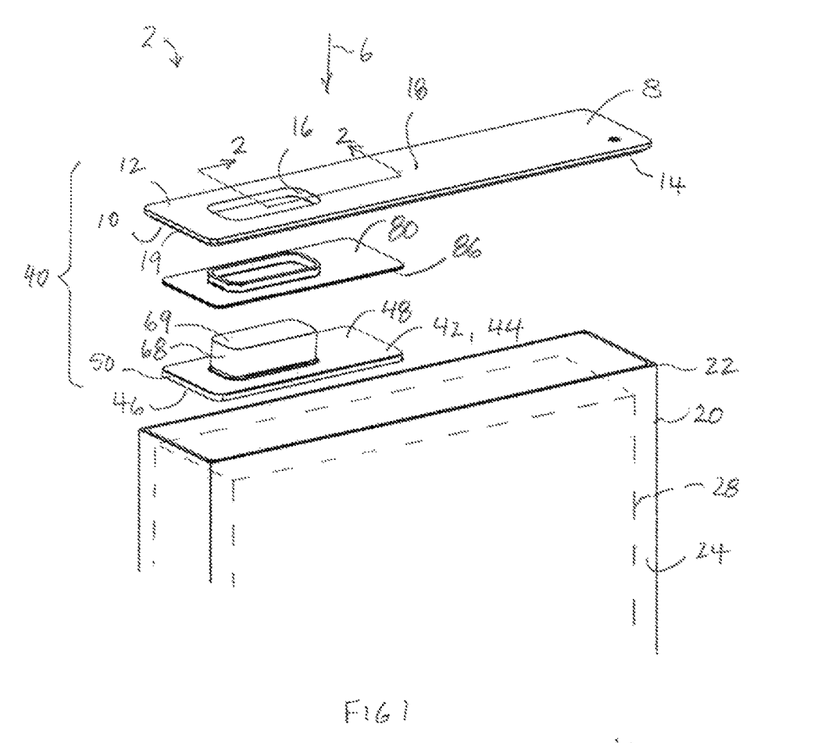
FIG. 1 is an exploded perspective view of an end of an electrochemical cell including a terminal assembly.
Figure 2:
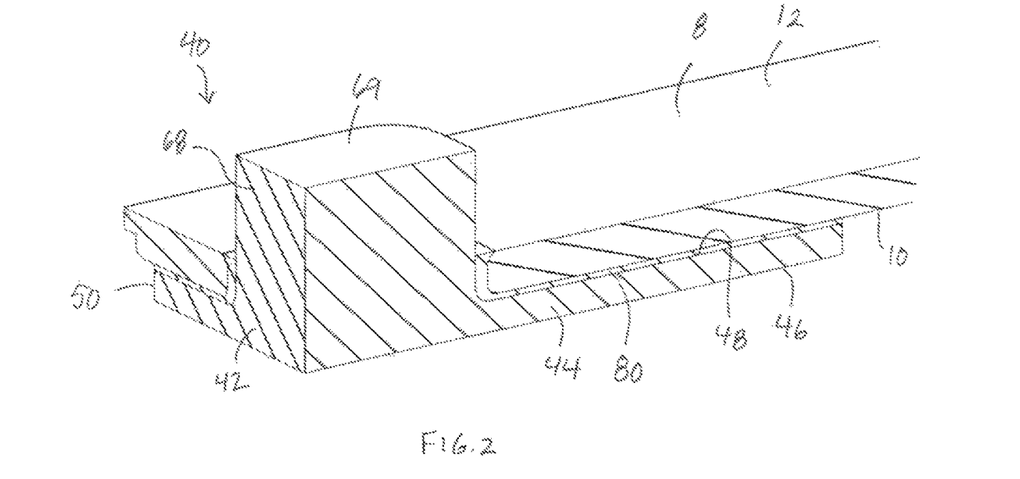
FIG. 2 is a cross sectional view of a portion of the terminal assembly of FIG. 1 as seen along line 2-2 of FIG. 1.

Referring to FIGS. 1 and 2, an electrochemical cell 2 may be a lithium-ion cell that includes an electrode assembly 28 that is sealed within a cell housing 20 along with an electrolyte to form a power generation and storage unit. In some embodiments, groups of cells 2 may be bundled together and electrically connected in series and/or in parallel to form battery modules (not shown), which in turn may be stored with other battery modules within a battery pack housing (not shown). The electrochemical cell may have a prismatic cell housing 20. As used herein, the term "prismatic" refers to the shape of cell housing 20, and particularly refers to having a rectangular shape. In the illustrated embodiment, the cell housing 20 includes a tubular sidewall 24 having a rectangular cross sectional shape. The sidewall 24 has an open first end 22, and an opposed second end (not shown) that is closed. A terminal assembly 40 is fixed to the sidewall first end 22 during cell manufacture to close the sidewall first end 22 and to form a sealed container. The terminal assembly 40 is a simple structure in that it includes only a few elements that are secured together using adhesive. For example, in some embodiments, the terminal assembly includes only a lid plate 8 and a terminal 42 that is supported on the lid plate 8, and secured thereto via an adhesive layer 80. In addition, the terminal assembly 40 includes features that ensure that the terminal assembly 40 is reliable and reproducibly made, as discussed in detail below.

The lid plate 8 is shaped and dimensioned to close the open first end of the sidewall 24, a terminal 42 that is supported on the lid plate 8, and an adhesive layer 80 that secures the terminal 42 to the lid plate 8. The lid plate 8 is a thin, electrically conductive plate having a rectangular profile when the cell 2 is viewed in the direction of the arrow 6 (FIG. 1), e.g., as seen in top plan view. In some embodiments, the lid plate is formed of metal, for example aluminum. The lid plate 8 includes an outer surface 12 that forms a portion of the outer surface of the cell housing 20, an inner surface 10 that is opposed to the outer surface 12 and faces the electrode assembly 28, and a peripheral edge 14 that extends between the inner and outer surfaces 10, 12. The lid plate 8 includes an opening 16 that is spaced apart from, and surrounded by, the peripheral edge 14. The opening 16 has a rectangular peripheral shape when the lid plate 8 is viewed in top plan view, and is configured to receive a boss 68 of the terminal 42, as discussed below.

The terminal 42 is electrically conductive and includes a terminal plate 44 and a boss 68 that protrudes from an outward facing surface 46 of the terminal plate 44. The terminal plate 44 is planar, thin plate and has a rectangular profile when viewed in top plan view. The terminal plate 44 includes an inward facing surface 46 that faces the electrode assembly 28, an outward facing surface 48 that is opposed to the inward facing surface 46 and faces the lid plate 8, and a peripheral edge 50 that extends between the inward and outward facing surfaces 46, 48.

The terminal plate inward facing surface 46 is electrically connected to portions of the electrode assembly 28 having a given electrical polarity. For example, in the illustrated embodiment, the terminal plate inward facing surface 46 may be electrically connected to positive electrodes of the electrode assembly 28, whereby the boss 68 serves as a positive terminal of the cell 2. In the illustrated embodiment, the sidewall 24 is formed of an electrically conductive material such as metal, and is electrically connected to portions of the electrode assembly 28 having an electrical polarity that is opposed to the polarity of the terminal 42. Thus, in this embodiment, the sidewall 24 is electrically connected to negative electrodes of the electrode assembly 28, whereby the sidewall 24 serves as a negative of the cell 2.

The terminal plate 44 has a width that is slightly less than the width of the lid plate 8. In addition, the terminal plate 44 has a length that is less than half a length of the lid plate 8. The terminal plate 44 is secured to the lid plate 8 adjacent to one end 19 of the lid plate 8 so that the terminal plate 44 resides between the one end 19 of the lid plate 8 and a center 18 of the lid plate 8, the terminal plate outward facing surface 46 faces the lid plate inner surface 10 and the boss 68 extends through the lid plate opening 16.

The boss 68 is a protrusion that extends outward from the terminal plate 44 in a direction normal to the outward facing surface 48. The boss 68 has a peripheral shape and dimensions that correspond to the shape and dimensions of the lid plate opening 8. In the illustrated embodiment, the boss 68 is rectangular, and dimensioned to extend through the opening 16 with a clearance fit. The boss 68 may have a low profile in that a height of the boss 68 is less than the length and width dimensions of the boss 68, where the boss height corresponds to a distance of a terminal end 69 of the boss 68 from the terminal plate outward facing surface 48.

In some embodiments, the terminal 42 is formed of metal. In some embodiments, the terminal plate 44 is formed of or coated with a first metal, for example copper, and the boss 68 is formed of or coated with a second metal that is different from the first metal. For example, the second metal may be aluminium.

Figure 3:
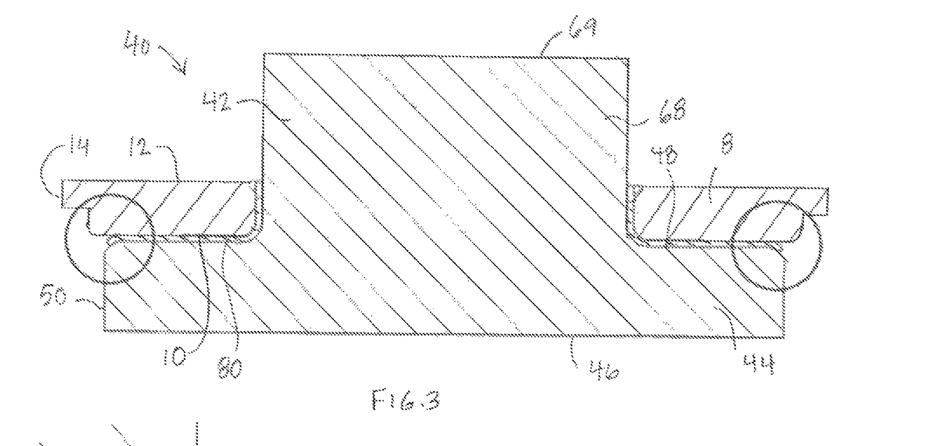
FIG. 3 is a cross sectional view of the terminal assembly of FIG. 1 as seen along line 3-3 of FIG. 1 illustrating the configuration of the adhesive layer.
Figure 4:
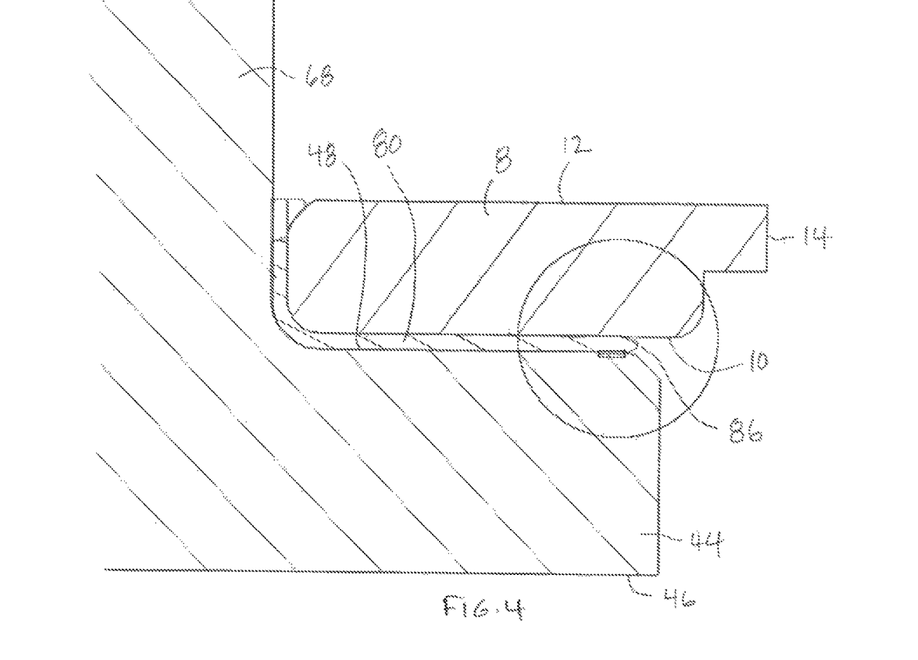
FIG. 4 is an enlargement of a portion of FIG. 3.

Referring also to FIGS. 3 and 4, the terminal plate 44 is secured to the lid plate 8 using adhesive. In particular, an adhesive layer 80 is provided between the outward facing surface 48 of the terminal plate 44 and the inner surface 10 of the lid plate 8. In addition to providing a securing function, the adhesive layer 80 is configured to provide a fluid-tight seal between the cell housing 20 (e.g., the lid plate 8) and the terminal 42 whereby moisture is prevented from exiting or entering the cell housing 20 via the opening 16, and is configured to electrically isolate the cell housing 20 (e.g., the lid plate 8) front the terminal 42.

To ensure that the adhesive layer 80 reliably performs its joining, sealing and electrical isolation functions, the adhesive layer 80 is required to cover the mutual interface between confronting surfaces of the lid plate 8 and the terminal 42 so as to extend between the boss 68 and the terminal plate peripheral edge 50. In particular, good results are obtained when the adhesive layer 80 extends to the peripheral edge 50 along the entire mutual interface between the confronting surfaces, without extending beyond the peripheral edge 50.

Figure 5:
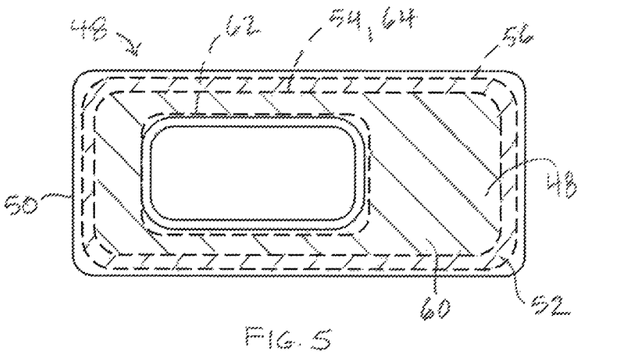
FIG. 5 is a top plan view of the terminal.

Referring to FIG. 5, the above described adhesive layer coverage configuration is achieved by providing the outward facing surface 48 of the terminal plate 44 with a first surface treatment in a first region 52, where the first surface treatment is configured to result in surface properties that negatively impact a flow of the adhesive layer 80. In some embodiments, the first surface treatment is configured to "activate" the surface to which it is applied whereby mechanical and/or chemical structures are formed on the surface that are configured to interact with or bond with the adhesive layer 80. The mechanical and/or chemical structures formed by the first surface treatment promote interaction between the adhesive layer and the surface treated by the first surface treatment, resulting in a restraining effect on the flow of the adhesive layer across this portion of the surface. It may also support formation of an adhesive layer peripheral edge 86 having a meniscus (e.g., rounded) shape, which is stable and relatively low in stress. By strategically arranging the first region 52, the first region 52 can serve as a stop line that inhibits the flow of the adhesive layer 80.

The first surface treatment may be any appropriate surface treatment that results in the activated surface. In one example, the first surface treatment may include sand coating plus silicate deposition, which increases the roughness of the surface. The increased roughness provides physical structures with which the adhesive layer 80 can mechanically engage. In another example, the first surface treatment may include laser structuring which increases the roughness of the surface and also forms an oxidation layer on the surface. As in the previous example, the increased roughness provides physical structures with which the adhesive layer 80 can mechanically engage. In addition, the adhesive layer 80 can form bonds (for example, covalent or hydrogen bonds) with the portions of the surface that have undergone oxidation.

In addition to providing the first surface treatment in the first region 52, the outward facing surface 48 of the terminal plate 44 is provided with a second surface treatment in a second region 60, where the second surface treatment is different from the first surface treatment. In particular, the second surface treatment is configured to result in surface properties that have no adverse impact on a flow of the adhesive layer 80. In some embodiments, the second surface treatment is an omission of a surface treatment, so that the surface in the second region 60 is untreated. In other embodiments, the second surface treatment is configured to result in surface properties that positively impact a flow of the adhesive, such as polishing or an application of a lubricant. Thus, the second region 60 does not inhibit flow of the adhesive layer 80 across the surface relative to properties of the surface in an untreated state, and may be configured to promote flow of the adhesive layer 80 across the surface in the second region 60.

In the illustrated embodiment, the first region 52 and the second region 60 are formed on the outward facing surface 48 of the terminal plate 44. Since it is desirable to have the adhesive layer flow up to and stop at the peripheral edge 50, the first region 52 is formed along the peripheral edge 50. That is, the first region 52 includes an outer boundary 56 that adjoins the terminal plate peripheral edge 50, and an inner boundary 54 that is disposed between the outer boundary 56 and the boss 68. In the illustrated embodiment, the inner boundary 54 is spaced apart from the boss 68, and the width of the first region 52 (e.g., the spacing between the first region inner boundary 54 and the first region outer boundary 56) is small relative to an overall width of the terminal plate 44. The width of the first region 52 depends at least on the properties of the surface within the first region 56 resulting from the first surface treatment, and is sufficiently large to stop the adhesive flow while being sufficiently small to allow the flow to reach the outer boundary 56.

The second region 60 is disposed between the first region 52 and the boss 68. In the illustrated embodiment, an outer boundary 64 of the second region 60 coincides with the inner boundary 54 of the first region 52, and an inner boundary 62 of the second region 60 adjoins the boss 68. Thus, the second region 60 encircles the boss 68 and includes the entire area of the outward facing surface 48 that resides between the boss 68 and the first region inner boundary 62.

In the assembled terminal assembly 40, the adhesive layer 80 is disposed between the lid plate 8 and the terminal 42 and overlies both the first region 52 and the second region 60 so as to extend between the boss 68 and the first region outer boundary 56, and the outer periphery 86 of the adhesive layer 60 overlies the first region outer boundary 56 when the terminal is viewed in top plan view. As a result, the outward facing surface 48 of the terminal can be fully covered in a controlled manner, without flowing beyond the terminal plate peripheral edge 50. As previously discussed, this is both mechanically and electrically advantageous since the resulting terminal assembly 40 is reliable, and the process of manufacturing the resulting terminal assembly 40 is more robust, permitting production at a higher scale relative to some conventional terminal assemblies.

Figure 6:
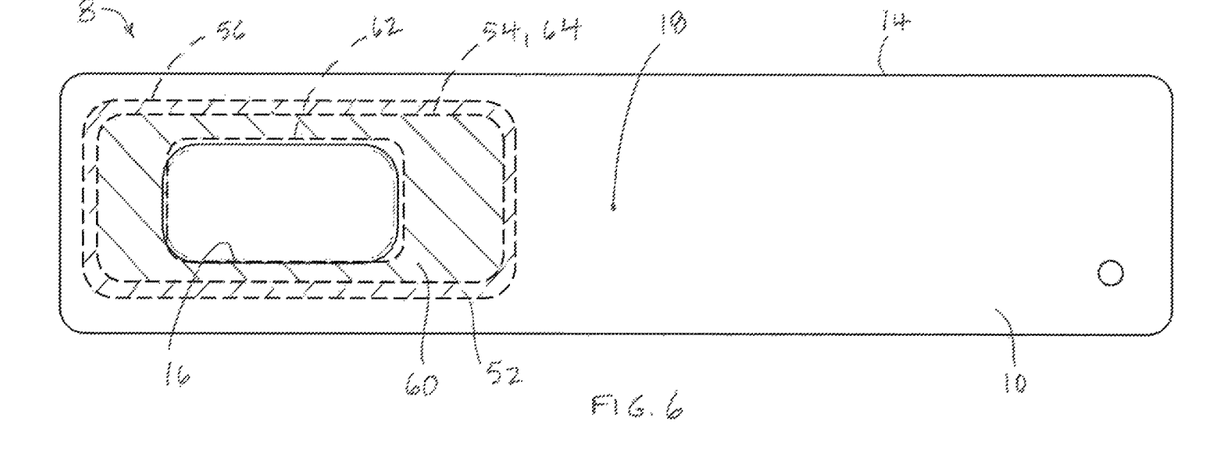
FIG. 6 is a bottom plan view of the lid plate.

Referring to FIG. 6, although the terminal assembly 40 is described as having the first and second regions 52, 60 formed on the terminal plate outward facing surface 48, the terminal assembly 40 is not limited to this configuration. For example, in some embodiments, the terminal plate outward facing surface 48 is free of the regions 52, 60 and corresponding surface treatments, and the first and second regions 52, 60 are formed on the lid plate inner surface 10. When formed on the lid plate inner surface 10, the first and second regions 52, 60 are shaped and dimensioned to correspond to the shape and dimensions of those regions had they been formed on the terminal plate outward facing surface 48. In addition, the first region 52 is positioned on the lid plate inner surface 10 in a location that corresponds to the location terminal plate peripheral edge 50 so that adhesive disposed between the lid plate 8 and the terminal 42 flows to the terminal plate peripheral edge 50 and does not flow beyond the terminal plate peripheral edge 50. In other embodiments, both the terminal plate outward facing surface 48 and the lid plate inner surface 10 are formed having the first and second regions 52, 60.

Figure 7:
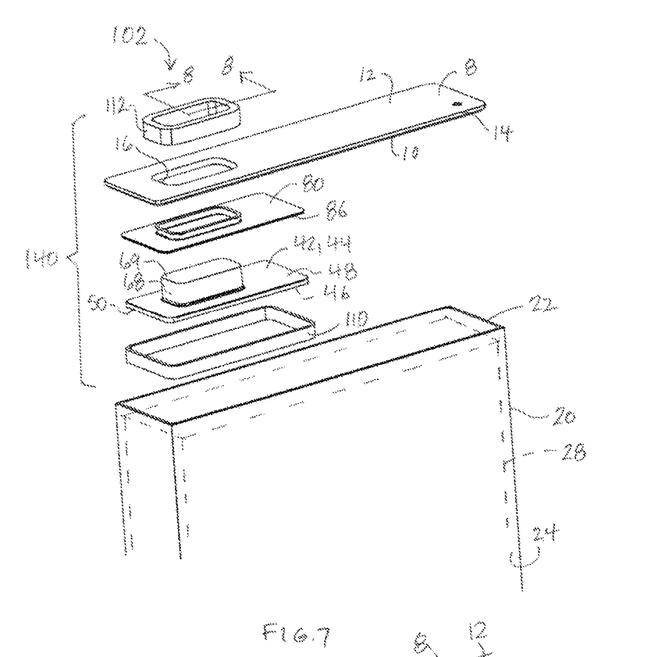
FIG. 7 is an exploded perspective view of an end of the electrochemical cell including an alternative embodiment terminal assembly.
Figure 8:
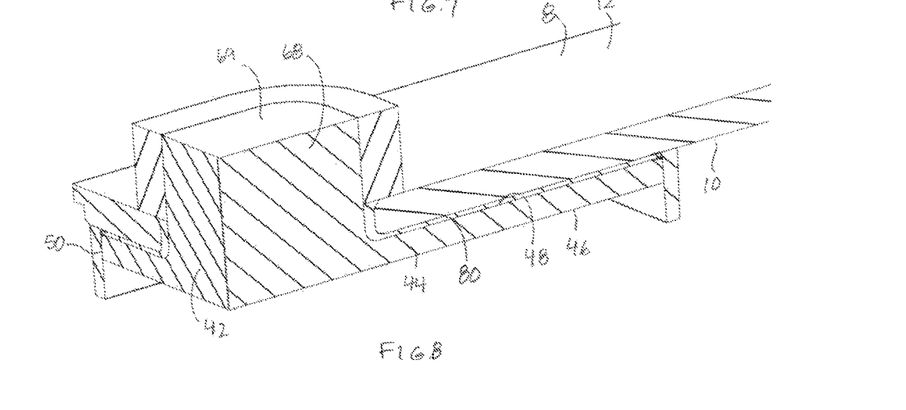
FIG. 8 is a cross sectional view of a portion of the terminal assembly of FIG. 7 as seen along line 8-8 of FIG. 7.

Referring to FIGS. 7 and 8, an alternative embodiment terminal assembly 140 includes the lid plate 8, the terminal 42 and the adhesive layer 80 described above with respect to FIGS. 1 and 2, and further includes an inner gasket 110 and an outer gasket 112. The inner gasket 110 resides inside the cell housing 20 and is fitted around the terminal plate peripheral edge 50. The inner gasket 110 provides a supplementary seal between the terminal plate peripheral edge 50 and the lid plate inner surface 10. The outer gasket 112 resides outside the cell housing 20 and is fitted around a circumference of the boss 68. The outer gasket 112 provides a supplementary seal between the outer surface of the boss 68 and the lid plate outer surface 12. The inner and outer gaskets 110, 112 may be an O-ring, an adhesive bead or other appropriate seal.

Figure 9:
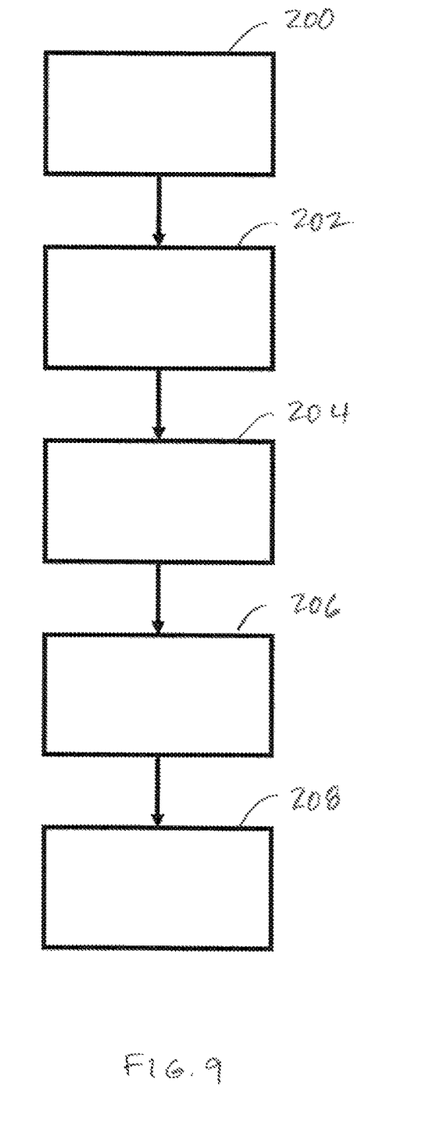
FIG. 9 is a flow chart illustrating a method of forming a terminal assembly for an electrochemical cell.

Referring to FIG. 9, a method of forming a terminal assembly for an electrochemical cell will now be described. The method includes providing the lid plate 8 including the opening 16 described above that is configured to close an open end of a cell housing 20 (Step 200). In addition, the method includes providing the terminal 42 including the terminal plate 44 and boss 68 that protrudes from the outward facing surface 48 of the terminal plate 44 as described above (step 202).

At least one of an inner surface 10 of the lid plate 8 and the outward facing surface 48 of the terminal plate 44 is then provided with a first surface treatment in a first region 52 thereof (Step 204). For purposes of explaining the method, it will be assumed that the first region 52 is formed on the outward facing surface 48 of the terminal plate 44, as shown in FIG. 5. In particular, the surface treatment is applied within the first region 52 in such a way as to form mechanical and/or chemical structures on the surface within the first region 52 that are configured to engage the adhesive layer 80, and thereby form a stop line at the location corresponding to the first region 52. In the illustrated embodiment, the first region 52 is formed at a location that corresponds to a peripheral edge of the terminal plate 44. Based at least on the material of the surface, the material of the adhesive layer, and the type of surface treatment employed, the width of the first region 52 is made sufficiently large to stop the adhesive flow while being made sufficiently small to allow the adhesive flow to reach the outer boundary 56. In the illustrated embodiment, the width of the first region is small relative to a width of the outward facing surface of the terminal plate 44. In addition, the first region 52 encircles and is spaced apart from the boss 68. The region between the first region 52 and the boss 68, e.g., the second region 60, also encircles the boss 68. The second region 60 is not subjected to the first surface treatment so that adhesive flow within the second region is not inhibited. In some embodiments the second region 60 is free of any surface treatment. In other embodiments, a second surface treatment that is different from the first surface treatment is applied to the second region 60. The second surface treatment 60 is configured to enhance the flow of adhesive, and thus may include polishing or the application of a lubricant within the second region 60.

When the surface has been treated, an adhesive layer is applied to the outward facing surface of the terminal plate (Step 206). For example, the adhesive is deposited on the surface and flows outward in all directions. For example, in some embodiments, the adhesive is applied in the second region 60 and flows outward to the first region 52. As the adhesive flows toward the terminal plate peripheral edge 50, the surface properties within the first region 52 affect the flow of the adhesive so that an adhesive layer 80 is formed that includes a peripheral boundary 86 formed within the first region 52. In particular, the adhesive layer peripheral boundary 86 generally coincides with the first region outer boundary 56.

Following application of the adhesive layer 80, the terminal 42 is assembled with the lid plate 8 such that the terminal plate outward facing surface 46 confronts the inner surface 10 of the lid plate 8, the boss 68 extends through the lid plate opening 16, and the adhesive layer 80 is disposed between the terminal 42 and the lid plate 8 (Step 208). In the assembled configuration, the adhesive layer 80 secures the terminal 42 to the lid plate 8, provides a fluid-tight seal between the cell housing 20 and the terminal 42 and electrically isolates the cell housing 20 from the terminal 42.

In the illustrated embodiment, the first region 52 (e.g., the stop line) is formed at a location that corresponds to the peripheral edge 50 of the terminal plate 44 so that the adhesive layer peripheral edge 86 forms along the terminal plate peripheral edge 50. It is understood that there may be embodiments in which it may be desirable to form the stop line at other locations, for example at a location inboard relative to the terminal plate peripheral edge 50. This is easily accommodated by appropriate placement of the first region 52.

In the above description, the second region is described as having different surface properties than the surface properties of the first region. In some embodiments, this is because the first region is subjected to the first surface treatment and the second region is not subjected to any surface treatment. In other embodiments, the first region is subjected to the first surface treatment and the second region is subjected to the second surface treatment, where the first surface treatment serves to activate the surface of the first region, and the second surface treatment serves to make the surface of the second region more flowable with respect to adhesive flow than an untreated surface, for example by polishing and/or adding a lubricant.

In the illustrated embodiment, the cell 2 includes a single terminal assembly that provides a first terminal of the cell 2, and the cell housing sidewall provides a second terminal of the cell. However, the cell 2 is not limited to this configuration. For example, in some embodiments, the cell 2 includes an alternative embodiment terminal assembly (not shown) in which the lid plate includes two openings 16, in which a terminal 42 is provided for each opening, and in which each terminal 42 is electrically connected to a unique portion of the electrode assembly 28.

Although the cell housing 22 has an elongated rectangular shape in the exemplary embodiments, the cell housing 22 is not limited to this shape. For example, the cell housing may be cuboid in shape. In another example, the cell housing may have other polygonal shapes that permit close packing such as an eight surface structure having hexagonally arranged sides (not shown).

Moreover, the cells 20 are not limited to being a lithium-ion battery. For example, the cells may be aluminum-ion, alkaline, nickel-cadmium, nickel metal hydride, or other type of cell.

Selective illustrative embodiments of the cell including the terminal assembly are described above in some detail. It should be understood that only structures considered necessary for clarifying these devices have been described herein. Other conventional structures, and those of ancillary and auxiliary components of the cell including the terminal assembly, are assumed to be known and understood by those skilled in the art. Moreover, while working examples of the cell including the terminal assembly have been described above, the cell including the terminal assembly are not limited to the working examples described above, but various design alterations may be carried out without departing from the devices as set forth in the claims.

What is claimed is:

1. A terminal assembly for an electrochemical cell, the terminal assembly comprising
a lid plate that closes one end of a cell housing of the electrochemical cell, the lid plate including an opening,
a terminal including a terminal plate and a boss that protrudes from an outward facing surface of the terminal plate, and
an adhesive layer disposed between the lid plate and the terminal,
wherein
the terminal is assembled with the lid plate such that the outward facing surface faces an inner surface of the lid plate and the boss extends through the opening,
one of the outward facing surface of the terminal plate and the inner surface of the lid plate comprises a first region and a second region,
the first region is spaced apart from the boss,
the second region is disposed between the first region and the boss,
the first region has first surface properties,
the second region has second surface properties that are different than the first surface properties, and
an outer boundary of the adhesive layer resides in an area corresponding to the first region when the terminal assembly is viewed in top plan view.

2. The terminal assembly of claim 1, wherein
the first surface properties are configured to negatively impact a flow of the adhesive layer, whereby the presence of the first region having the first surface properties serves as a stop line that inhibits the flow of the adhesive layer, and
the second surface properties are configured to have less negative impact on the flow of the adhesive layer than that of the first surface properties.

3. The terminal assembly of claim 1, wherein the first surface properties are a result of a surface treatment, and the second surface properties are a result of a lack of the surface treatment.

4. The terminal assembly of claim 1, wherein the first region encircles the boss.

5. The terminal assembly of claim 1, wherein the adhesive layer overlies both the first region and the second region.

6. The terminal assembly of claim 1, wherein an outer periphery of the adhesive lager overlies an outer boundary of the first region when the terminal is viewed in top plan view.

7. The terminal assembly of claim 1, wherein the outward facing surface of the terminal plate includes the first region and the second region, and the first region includes a portion of the outward facing surface of the terminal plate that adjoins a peripheral edge of the terminal plate.

8. The terminal assembly of claim 7, wherein an outer boundary of the first region coincides with the portion of the outward facing surface of the terminal plate that adjoins a peripheral edge of the terminal plate.

9. The terminal assembly of claim 1, wherein the second region adjoins the boss and the second surface properties are a result of a lack of a surface treatment.

10. The terminal assembly of claim 1, wherein the adhesive layer overlies the first region and the second region so as to extend between the boss and an outer boundary of the first region.

11. The terminal assembly of claim 1, wherein the first surface properties are a result of a surface treatment that is configured to form a roughened surface.

12. The terminal assembly of claim 1, wherein the first surface properties are a result of a surface treatment that is configured to form an oxidation layer.

13. The terminal assembly of claim 1, wherein the cell housing is formed of metal, the terminal is formed of metal, and the adhesive layer secures the terminal to the lid plate, provides a fluid-tight seal between the cell housing and the terminal, and electrically isolates the cell housing from the terminal.

14. A method of forming a terminal assembly for an electrochemical cell, the method comprising the following method steps,
providing a lid plate that is configured to close an open end of a housing of the electrochemical cell, the lid plate including an opening;
providing a terminal comprising a terminal plate and a boss that protrudes from an outward facing surface of the terminal plate;
treating with a surface treatment a first region of one of an inner surface of the lid plate and the outward facing surface of the terminal plate such that the first region has first surface properties;
applying an adhesive layer to the one of an inner surface of the lid plate and the outward facing surface of the terminal plate, wherein the first surface properties are configured to negatively impact a flow of the adhesive layer, whereby the presence of the first region having the first surface properties serves as a stop line that inhibits the flow of the adhesive layer along the one of the inner surface of the lid plate and the outward facing surface of the terminal plate, and an outer boundary of the adhesive layer resides in an area corresponding to the first region when the terminal assembly is viewed in plan view; and
assembling the terminal with the lid plate such that the outward facing surface of the terminal plate confronts the inner surface of the lid plate, the boss extends through the opening, and the adhesive layer provides a fluid-tight seal between the cell housing and the terminal, and electrically isolates the cell housing from the terminal.

15. The method of claim 14, wherein the first region is spaced apart from, the boss, and the one of an inner surface of the lid plate and the outward facing surface of the terminal plate comprises a second region disposed between the first region and the boss, the second region having second surface properties that are different than the first surface properties, and the adhesive layer is disposed in both the first region and the second region.

16. The method of claim 15, wherein the second surface properties are configured to allow greater flow of the adhesive layer than the first surface properties.

17. A method of forming a terminal assembly for an electrochemical cell, the method comprising the following method steps,
providing a lid plate that is configured to close an open end of a housing of the electrochemical cell, the lid plate including an opening;

providing a terminal comprising a terminal plate and a boss that protrudes from an outward facing surface of the terminal plate;

prior to application of an adhesive layer to one of an inner surface of the lid plate and the outward facing surface of the terminal plate, forming a stop line of the adhesive layer by providing a surface treatment in a first region of the one of the inner surface of the lid plate and the outward facing surface of the terminal plate, the first region formed at a location corresponding to the stop line;

applying an adhesive layer to the one of the inner surface of the lid plate and the outward facing surface of the terminal plate, the adhesive layer forming an adhesive layer peripheral boundary that coincides with the stop line; and assembling the terminal with the lid plate such that the outward facing surface of the terminal plate confronts the inner surface of the lid plate, the boss extends through the opening, and the adhesive layer provides a fluid-tight seal between the cell housing and the terminal and electrically isolates the cell housing from the terminal.

18. The method of claim 17 wherein the first region is spaced apart from the boss, and the one of an inner surface of the lid plate and the outward facing surface of the terminal plate comprises a second region disposed between the first region and the boss, the second region having second surface properties that are different than first surface properties of the first region, and the adhesive layer is disposed in both the first region and the second region.

19. The method of claim 18, wherein the second surface properties are configured, to allow greater flow of the adhesive layer than the first surface properties.

20. A terminal assembly for an electrochemical cell, the terminal assembly consisting of
a lid plate configured to close one end of a cell housing of the electrochemical cell, the lid plate including an opening,
a terminal including a terminal plate and a boss that protrudes from an outward facing surface of the terminal plate, and
an adhesive layer disposed between the lid plate and the terminal,
wherein
the terminal is assembled with the lid plate such that the outward facing surface faces an inner surface of the lid plate and the boss extends through the opening.

* * * * *

UNITED STATES PATENT AND TRADEMARK OFFICE
CERTIFICATE OF CORRECTION

PATENT NO. : 10,374,210 B2
APPLICATION NO. : 15/795733
DATED : August 6, 2019
INVENTOR(S) : Andreas Ringk et al.

It is certified that error appears in the above-identified patent and that said Letters Patent is hereby corrected as shown below:

In the Claims

In Claim 6, at Column 11, Line 54, delete the word "lager" and insert the word --layer-- in its place.

In Claim 15, at Column 12, Line 52, delete the "," between the word "from" and the word "the".

In Claim 19, at Column 14, Line 8, delete the "," between the word "configured" and the word "to".

Signed and Sealed this
Twenty-fourth Day of December, 2019

Andrei Iancu
*Director of the United States Patent and Trademark Office*